2,812,253

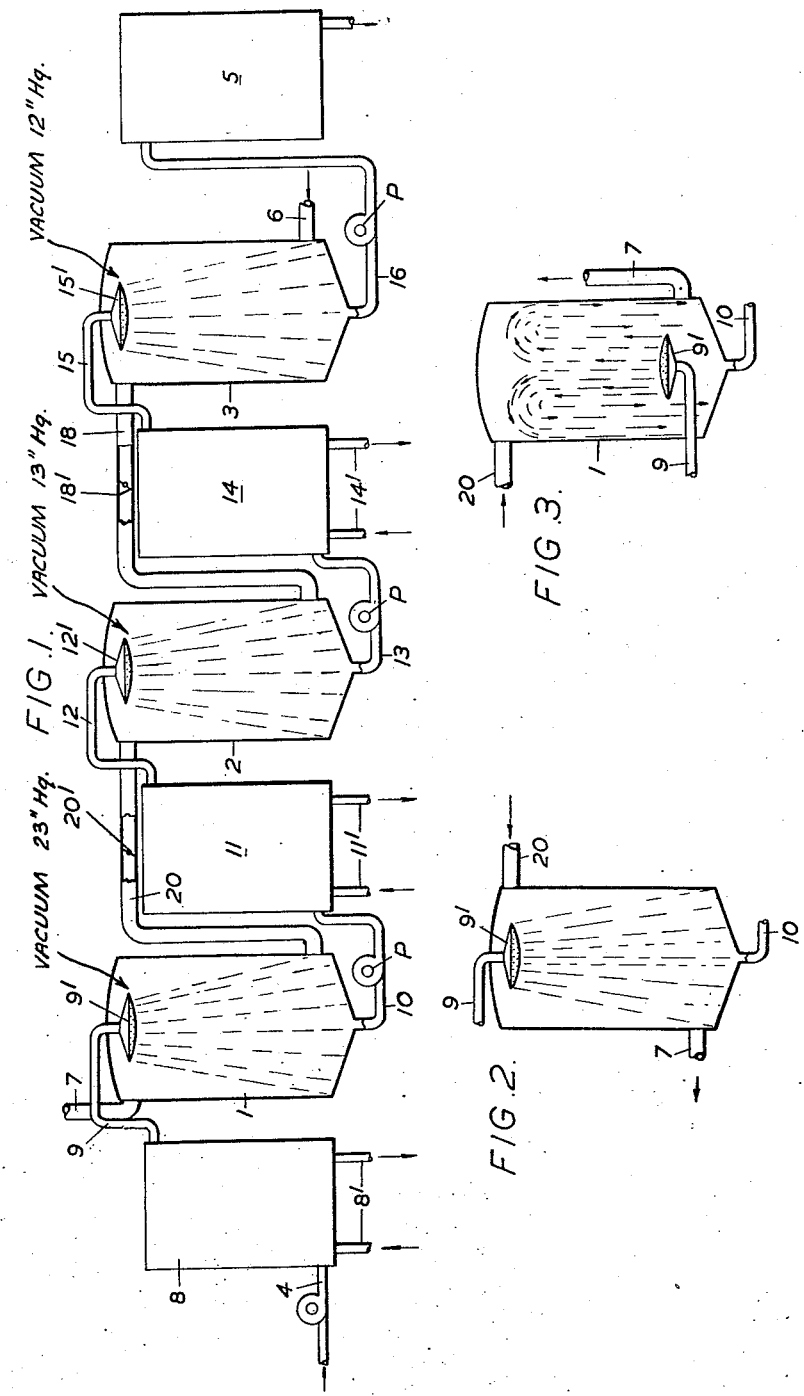

TREATMENT OF CREAM

George Anthony Dummett, Ham, England, assignor to The A. P. V. Company Limited, London, England Application July 27, 1953, Serial No. 370,588

Claims priority, application Great Britain March 26, 1953

2 Claims. (Cl. 99—61)

This invention relates to the treatment of cream for the purpose of removing from it undesirable odours; the invention is particularly concerned with the treatment of cream for butter making.

Various proposals have already been made for that purpose but they all suffer from some disadvantage such as the loss of part of the valuable constituents of the cream, incomplete deodourisation, dilution resulting from the heating which is necessarily used in the treatment, excessive break-up of the fat globules (leading to fat loss in the butter-milk) or excessive steam consumption.

The main object of this invention is to provide a process which avoids the disadvantages referred to while at the same time providing a process which is economical to operate.

Broadly stated the present invention consists in deodourising cream by passing the cream through two or more stages of distillation by steam which flows through the stages in succession and in general counter-flow to the direction of flow of the cream so that fresh steam meets the cream in the last stage and completes the treatment which has been effected in the preceding stage or stages by steam which has passed on successively through the stages one after the other from the last stage towards the first stage.

In order to promote the distilling action of the steam and to assist in the removal by the steam of the unwanted volatile constituents of the cream, the flow of the cream is, at each stage, broken up by supplying the cream under gravity or preferably under pressure, to some device such as perforated plates or spray producers which compel the cream to pass into each stage in the form of small particles or extended films to meet the steam.

The number of stages of distillation can be varied to suit the requirements in any particular case but in general two or three stages would be sufficient: the use of the different stages enables each distillation effect to be carried out under pressure conditions (in the distillation vessel or column) which will assist efficient action on the cream as it passes through that stage; the cream being broken up a number of times (depending on the number of stages) results in efficient action on the cream as a whole. Moreover, the use of the steam by passing it through the stages in series effects economy in the consumption of steam.

Although, as stated, the cream and the steam pass in counter flow in the process regarded as a whole, i. e. the steam is supplied to the cream out-put end of the process the flow of cream and steam in each stage can, as will be understood by those familiar with distillation procedure, be counter-current or co-current or of course it can be a combination of the two, so long always as the cream moves stage by stage against steam which is increasingly fresh as the cream passes to its out-put.

The cream would be pre-heated on passing to the multistage distillation action and it could also be heated between stages by any known means; thus heating of the cream can be effected by indirect heating in a heat exchanger, by direct heating by steam injection into it or by a combination of the two forms of heating either at any one stage or by the different forms at the different stages as is most suitable. The principle of regenerative heating could be employed by employing the distilling steam or some part of it after it has passed through one or more or all of the distillation stages to heat the cream. A small amount of flash evaporation may be advantageous in any or every distillation stage but this is not essential.

It will of course be understood that the unwanted constituents are carried away by the steam leaving the first stage of the distillation (i. e. that to which the cream is first fed) the remainder of the cream being collected and passed on to the next stage or from the final stage to a cooler.

Figure 1 shows an installation using a three-stage distillation process, the three distillation vessels being indicated at 1, 2, 3.

Figure 2 shows a vessel wherein the cream and steam enter the upper end thereof and have co-current flow; and Figure 3 shows a vessel wherein the cream and steam have counter-flow and co-current flow.

Referring to Figure 1 of the drawing, the cream to be treated is supplied to the installation through a supply pipe 4 whence the cream passes through the vessels in the sequence 1, 2, 3, the treated cream finally being discharged to a cooler 5.

The distilling steam is supplied to the installation through a supply pipe 6 whence the steam passes to the vessels 1, 2, 3, in the sequence 3, 2, 1, so that the flow of steam is generally in counter flow to that of the cream, the steam finally passing away through a discharge pipe 7 to a condenser and a source of vacuum.

Considering firstly the cream flow, it passes from the supply pipe 4 to a heating device 8, thence through a pipe 9 to the first stage distillation vessel 1, and after steam distillation in that vessel the cream is taken by a pipe 10 to an inter-stage heating device 11 thence through a pipe 12 to the second stage distillation vessel 2. After the second stage of steam distillation in the vessel 2 the cream is taken through a pipe 13 to a second inter-stage heating device 14 whence it passes through a pipe 15 to the third (and in the example shown, the final) stage of steam distillation in the vessel 3 from which it passes through a pipe 16 to the cooler 5. In each distillation vessel, the cream flow is sub-divided or broken up into drops or a spray, this being effected by terminating the pipes 9, 12, and 15 by spray heads indicated at 9', 12', 15'.

Considering now the flow of the distilling steam, the steam passes from the supply pipe 6 to the final stage vessel 3 whence it passes through the vessel to effect the final distillation of the cream passing from the spray head 15. The steam having effected one stage of distillation in the vessel 3 is now taken by a pipe 18 from the vessel 3 and passes back against the progression of the cream to the vessel 2 where that same steam is used again to carry out a distilling action on the cream flowing from the spray head 12' so that the steam affords the second stage distillation regarded in the cream flow. The steam having traversed the second stage vessel, it is taken by a pipe 20 to the first stage vessel 1 in which the cream is given its first stage of distillation, the steam having completed its traverse through the three stages being taken away through the pipe 7, to a condenser which may also serve, partially at least, as a pre-heater for incoming cream.

It will be obvious that by the time the cream has reached the final distillation vessel 3, it has already been subjected to two stages of treatment so that the fresh steam supplied at this final stage is easily able to remove the remaining impurities from the cream which therefore passes out as an end product of high quality.

By the time the steam reaches the first stage of distillation in the vessel 1, it is somewhat contaminated but in this first stage the cream has its full complement of unwanted components and therefore the steam, contaminated though it may be, is presented with a light duty to remove a large proportion of the unwanted constituents. At the same time the repeated use of the steam in stage after stage enables economy to be effected in the consumption of fuel to generate the steam. Thus the invention can be said to produce an improved cream with economy in operating costs.

In the example shown in Figure 1 the steam passes in each stage in counter flow to the cream: this however is not essential and it may be convenient as is shown in Figure 2 for the steam supply to one or more of the vessels, 1, 2 or 3 to be arranged to flow in the same sense as the cream although regarding the whole installation or more precisely the entire flow it is in the sense which is counter to that of the cream. Thus in Figure 2 the steam taken from the stage vessel 2 by the pipe 20 is passed into the upper end of the vessel 1 and the steam discharge pipe 7 is located at the base of the vessel so that the cream and the steam descend together, i. e. they move in a like sense of flow.

It would also be possible, as is indicated in Figure 3, to cause the cream and steam flow in any one stage to be a combination of counter-flow and co-current flow: thus, referring to Figure 3 which shows the mixed flow as applied for example to the vessel 1, the cream supply via the pipe 9 is effected at the lower end of the vessel so that the cream passes upwardly and then falls back to the base of the vessel where it is withdrawn through the pipe 10 for the succeeding stage. The distiling steam is supplied as in Figure 1 through the pipe 20 and withdrawn through the pipe 7 so that while the cream is rising in the vessel it is in counter-current flow with the steam and when falling back is in co-current flow with the steam.

Obviously instead of the spray producers, perforated plates could be used in the vessels and the steam caused to flow transversely across the plates in the manner which is well known in the art of distillation, the steam, although having the transverse movement, having also a general flow progression in the manner referred to.

The distillation vessels 1, 2, 3 would be maintained under vacuum and the cream on entering any one or more of the vessels could be caused to flash evaporate. For this purpose and to enable the degree of vacuum to be regulated in the different vessels, the steam flow pipes 18 and 20 are provided with control valves 18', 20'.

A typical example of suitable operating conditions is given in the following table:

1st stage—Distillation vessel 1 maintained at an internal pressure of 23" (Hg)—corresponding boiling point 145° F. Cream supplied at 150° F.=5° flash.
2nd stage—Distillation vessel 2 maintained at an internal pressure of 13" (Hg)—corresponding boiling point 185° F. Cream temperature raised between 1st and 2nd stages to 190° F.=5° flash.
3rd stage—Distillation vessel 3 maintained at an internal pressure of 12" (Hg)—corresponding boiling point 187° F. Cream temperature raised between 2nd and 3rd stages to 190° F.=3° flash.

The heating devices 8, 11 and 14 may be of the plate heat-exchanger type, the heating being effected by the extraction of heat from a heating medium caused to flow to and from the devices by pipes 8', 11', 14' respectively.

The principle of regenerative heating can be employed by using the hot treated cream, the distillation steam or the condenser water as the heating medium.

The cream may alternatively be heated by direct steam injection or any combination of these heating methods may be adopted at the various stages as is found most convenient and economical.

As will be clear, pumps can be provided as is found necessary to maintain flow of cream, such pumps being indicated in the drawing by the reference P.

What I claim is:

1. In the treatment of cream for the purpose of deodorizing it by steam, the method which consists in passing the cream successively through a number of chambers, passing steam from chamber to chamber in a counter-flow direction to that of the cream, causing the cream and the steam to move in co-current flow in at least one of the chambers, maintaining the chambers at pressures which decrease in the direction of the steam flow, and maintaining the chambers under different degrees of vacuum so that the steam is induced to flow from chamber to chamber by the pressure differences between them.

2. In the treatment of cream for the purpose of deodorizing it by steam, the method which consists in passing the cream successively through a number of chambers, passing steam from chamber to chamber in a counter-flow direction to that of the cream, causing the cream and the steam to move in counter-current and co-current flow in at least one of the chambers, maintaining the chambers at pressures which decrease in the direction of the steam flow, and maintaining the chambers under different degrees of vacuum so that the steam is induced to flow from chamber to chamber by the pressure differences between them.

References Cited in the file of this patent

UNITED STATES PATENTS

| | | |
|---|---|---|
| 2,041,059 | French | May 19, 1936 |
| 2,078,841 | Fauth | Apr. 27, 1937 |
| 2,091,606 | Murray | Aug. 31, 1937 |
| 2,516,099 | Board et al. | July 25, 1950 |